United States Patent [19]

Bunger et al.

[11] Patent Number: 5,302,211
[45] Date of Patent: Apr. 12, 1994

[54] PROCESS FOR THE REMEDIATION OF CONTAMINATED SOIL

[75] Inventors: James W. Bunger; Christopher P. Russell; Donald E. Cogswell, all of Salt Lake City; Jerald W. Wiser, Kaysville, all of Utah

[73] Assignee: James W. Bunger & Assoc., Inc., Salt Lake City, Utah

[21] Appl. No.: 932,090

[22] Filed: Aug. 19, 1992

[51] Int. Cl.$^5$ .................. B08B 1/02; B08B 3/04; B08B 3/08

[52] U.S. Cl. ............... 134/25.1; 134/25.5; 134/32

[58] Field of Search ......... 134/25.1, 25.5, 32; 210/660, 908, 909, 682

[56] References Cited

U.S. PATENT DOCUMENTS

| | | | |
|---|---|---|---|
| 4,783,263 | 11/1988 | Trost et al. | 210/638 |
| 4,951,417 | 8/1990 | Gerken et al. | 47/1.42 |
| 5,056,541 | 10/1991 | Schade et al. | 134/25.1 |
| 5,080,721 | 1/1992 | Flanigan et al. | 134/36 |

OTHER PUBLICATIONS

"Soil Washing Results of EPA Tests for Effectiveness" *The Hazardous Waste Consultant* (May/Jun.) 1989 pp. 1-11 to 1-16.

*Primary Examiner*—Theodore Morris
*Assistant Examiner*—Thomas G. Dunn, Jr.
*Attorney, Agent, or Firm*—James L. Sonntag

[57] ABSTRACT

A process and apparatus for the remediation of soil is provided with a plug flow of soil and counter-current wash of water. The contaminant-containing soil with water is first treated to disengage the contaminant from the soil and form a liquid phase containing water and contaminant. The treated soil and liquid phase is continuously introduced into a wash zone at a first end of the wash zone, and the soil and the liquid phase are conveyed in successive and discrete portions through the wash zone between the first end of the wash zone and a second end of the wash zone to provide an essentially plug-flow of the soil through the wash zone. Wash water is introduced into the wash zone by continuously adding water to the discrete portions at the second end of the wash zone, and the wash water is conveyed through the wash zone between adjacent wash cells toward the first end counter to the plug flow conveyance of the soil and the liquid phase, such that contaminants in the liquid phase are removed from the liquid phase by the wash water. The soil and liquid phase with contaminants removed are continuously withdrawn from the wash zone as each discrete portion reaches the second end of the wash zone. The wash water containing removed contaminants is withdrawn from the discrete portions at the first end of the wash zone.

11 Claims, 4 Drawing Sheets

PROCESS FOR THE REMEDIATION OF CONTAMINATED SOIL

FIELD OF THE INVENTION

This invention relates to an apparatus and process for the remediation of contaminated soil.

BACKGROUND OF THE INVENTION

As a result of human activity there have been accidental, deliberate or unknowing releases of petroleum products, chemicals, metals and hazardous, toxic and radioactive substances (hereinafter referred to as contaminants) into the environment. In many of these cases, these releases have been to the terrestrial environment. Upon contact with soil, rock and other solids of the terrestrial environment, these contaminants mix and adsorb making recovery of the contaminants extremely difficult. Left unrecovered these contaminants may be transported to the biosphere through surface or ground water, or through direct contact, resulting in a hazard to living orgaisms, including human beings. There are increasing worldwide requirements to clean or "remediate" contaminated terrestrial solids by recovering these undesirable contaminants and safely disposing of them.

Current technologies for remediating contaminated soil fall into two broad categories: in-situ, those technologies which extract the contaminant while the soil remain in-place; and ex-situ, those technologies which excavate the contaminated soil and treat that soil by surface process technologies. While in-situ technologies have proven useful for certain types of contaminants such as volatile organics, in-situ technology has not proven to be generally applicable to a broad range of undesirable contaminants.

Among the ex-situ technologies, there are two generic approaches: thermal and water-washing. Thermal processes rely on distillation, pyrolysis and/or combustion of the contaminants. Thermal processes are applicable only to organic contaminants and are ineffective for remediation of soils with metal or radioactive contaminants. Thermal processes are inherently energy-intensive, resulting in high costs. Thermal processes also have air quality implications, requiring air quality permitting.

Washing of soil with water has been previously proposed, in for example U.S. Pat. Nos. 5,056,542, 4,951,417, 4,783,263, and "Soil Washing Results of EPA Tests for Effectiveness" *The Hazardous Waste Consultant* (May/June) 1989 pp 1-11 to 1-16. In general, proposed soil-washing processes rely on technologies largely developed in the extractive metallurgy industry. Common to these approaches are a form of pretreatment in which surfactant, caustic or other ingredients are added to water and soil and the components are mixed in a stirred tank. The resulting pre-treated mixture is then sent to an air flotation device in which the organic material is caused to float while the heavier-than-water ingredients such as minerals and soil, sink to the bottom and are removed.

Water washing technologies, using traditional extractive metallurgy configurations, are generally limited to petroleum hydrocarbons and other insoluble organics whose density is approximately equivalent to, or less than, that of water. These technologies are not by themselves applicable to water-soluble contaminants, which require additional soil washing and water processing steps for removal.

Many of the difficulties with current soil-washing technologies relate to the requirements for a large pretreatment vessel and multiple flotation stages. The stirred-tank process design inherently requires multiple stages, often with long residence times, to achieve a high-level of separation of the contaminants from the soil. Further, the current soil washing processes separate primarily water-insoluble organic contaminants. Therefore, any soluble mineral or soluble organic contaminants remain with the water and are discharged, along with the soil in the underflow of the flotation cells. A further process is accordingly required to further decontaminate the underflow from the flotation stages.

A further problem of currently-practiced technology is the need for large volumes of water. Even though water is recycled, the overall volume of water in the recycle loop may be several times the inventory of the soil in the process. These high water-to-soil ratios, along with the mixing of fresh water in the downstream settlers and thickeners, tend to dilute the recycle streams and make maintenance of process water quality difficult. In addition, the high ratio of water to soil and the inherent inflexibility of multiple, stirred-tank reactor stages render it difficult to control the process to achieve a high degree of remediation. In addition, the contaminate in aqueous outflow from the cells is often highly diluted. For these reasons, the outflow often requires a further cleaning and often requires large water processing facilities.

OBJECTS OF THE INVENTION

It is, therefore, an object of the present invention to provide an apparatus and process for the remediation of contaminated soil that achieves a high level of separation of contaminants from contaminated soil.

It is also an object of the present invention to provide an apparatus and process for the remediation of contaminated soil that uses significantly less water than traditional washing techniques, with a minimum of make-up water and a minimum of water in the recycle inventory.

It is also an object of the present invention to provide an apparatus and process for the remediation of contaminated soil with a relatively short-residence time of the soil.

It is also an object of the present invention to provide an apparatus and process for the remediation of contaminated soil that is applicable to organic contaminants, whether water soluble or insoluble, and water soluble inorganic contaminants, including salts, metals, and radionuclides.

Further objects of the invention will become evident in the description below.

SUMMARY OF THE INVENTION

An embodiment of the invention is a process for the remediation of soil containing contaminant comprising;

(a) treating contaminant-containing soil with water to disengage the contaminant from the soil and form a liquid phase containing water and contaminant, (b) continuously introducing the treated soil and the liquid phase from step (a) into a wash zone at a first end of the wash zone, (c) conveying the soil and the liquid phase in successive and discrete portions through the wash zone between the first end of the wash zone and a second end of the wash zone to provide an essentially plug-flow of the soil through the wash zone, (d) introducing wash water into the wash zone by continuously adding water to the discrete portions at the second end of the wash zone, (e) conveying the wash water through the wash zone between adjacent wash cells toward the first end counter to the plug flow conveyance of the soil and the liquid phase, such that contaminants in the liquid phase are removed from the liquid phase by the wash water, (f) continuously withdrawing the soil and the liquid phase with contaminants removed from the wash zone as each discrete portion reaches the second end of the wash zone, and (g) withdrawing wash water containing removed contaminants from the discrete portions at the first end of the wash zone.

Another embodiment of the invention is an apparatus for remediation of soil containing contaminants comprising;

(a) a disengagement zone for treating contaminant-containing soil with water to disengage the contaminant from the soil and form a liquid phase containing water and contaminant, (b) a wash zone with a first end and a second end, (c) a plurality of wash cells, each adapted to contain a discrete portion of soil and liquid phase, (d) a conveyance means for successively conveying the wash cells from the first end to the second end, (e) a soil feed means for introducing soil containing contaminants into the wash cells at the first end, (f) a soil output means for withdrawing the soil from the wash cells at the second end, (g) a water feed means for introducing wash water into the wash cells at the second end, (h) a wash water withdrawing means for withdrawing water from the wash cells at the first end, and (i) a water conveying means for conveying wash water from the second end to the first end by conveying water between the wash cells in a direction counter to the conveyance of the wash cells.

By "soil," as used herein, is meant consolidated and unconsolidated mineral substances, and includes, but is not limited to naturally deposited materials that cover the surface of the earth, ground mineral materials resulting from mining, ores, excavation, and the like, clays, gravels, sand, silt, and fill materials, and may or may not also contain organic and humic matter.

Disengagement of the contaminant from the soil matrix is required to remove bound contaminant from the solid soil phase and create a liquid phase containing contaminant. The contaminated soil is treated with water, along with any required chemical additives to form the liquid phase. As use herein, "liquid phase" means a homogeneous or nonhomogeneous liquid aqueous phase that contains contaminant. The liquid phase may be in any liquid form wherein contaminant is carried with the liquid, e.g.; water with contaminate dissolved therein; water with suspended or emulsified contaminate, either as a solid or liquid; and water with liquid or solid contaminant floating as a separate phase on the water. In the process of the invention, the liquid phase is conveyed along with the soil, and contaminants that have been disengaged from the soil are extracted from the liquid phase. A product of the present process is a mixture of soil and extracted liquid phase, which may be separated into a decontaminated soil stream and an extracted liquid phase stream. The extracted liquid phase may then be disposed of by conventional methods, or recycled into the process, e.g., as feed for the disengagement means, or into the feed for the wash water.

The means for disengagement may be any suitable means for freeing the contaminant from the soil matrix to form the liquid phase. Preferably, a plug flow disengagement means, as described in the example below is used. However, any plug flow, or mixed reactor system is suitable. The specific disengagement process will depend on the nature of the contaminant. For water soluble contaminants, an environment to dissolve the contaminant from the soil into water is required. Certain solid contaminants may be freed from the soil by appropriate floatation reagents that form a solid-containing foam on the surface of the liquid phase. Insoluble liquid contaminants, such as petroleum and its derivatives, can be treated with aqueous surfactant solution to form a liquid phase with the contaminant either suspended or floating on the top.

The wash zone is the zone wherein contaminant is extracted by wash water from the liquid phase, and is between the soil-inlet or first end and the soil-outlet or second end. In the preferred embodiment, the wash zone is preferably provided by a cylindrical drum with its axis on a tilted or skewed alignment, i.e., on neither a vertical nor a horizontal axis. Within the drum is a helical weir wall, which functions as the means for conveying the soil and liquid phase through the wash zone. The helical weir wall acts as a screw conveyor that moves the soil and liquid phase as discrete portions from the first end of the drum to the second end of the drum. Since the weir wall conveyor is in the form a helix and the drum is tilted, the soil and liquid phase can be conveyed as discrete portions in separate wash cells along the cylinder. The drum and screw helix may extend beyond the first and second ends of the wash zone (the region between the wash water feed and the wash water withdrawing mean) to provide mixing or disengagement. For example, the physical soil inlet of the drum may be one or more cells below the wash water feed to insure mixing of the soil in the cells, and to provide further disengagement of the contaminant.

The portions of the helical wall between the wash cells, those that contain the discrete portions of the soil, also function as weir for wash water flowing between adjacent cells. Wash water is introduced into the soil-outlet or second end, and, because of the tilted alignment of the cylinder, wash water flows from the second end down through the cylinder, flowing from cell to cell over the weir wall, to the soil-inlet or first end. The weir wall essentially prevents a back-flow of water to an adjacent cell in the direction toward the second end, providing an continuous flow of water in the other direction, or counter-current to the plug-flow of the discrete soil and liquid phase portions. This configuration provides for staged dilution of contaminated water without back-mixing.

Although, the means for conveying the soil through the wash zone is preferably provided by a helical weir wall on the interior wall of a cylinder that functions as a screw conveyer, as described above, any means that conveys soil through the wash zone in discrete portions, while allowing a counter current flow of water as described below, is suitable. For example, an inclined chain or belt conveyor can move soil carrying buckets or wash cells upwards along the conveyor, while water is cascaded down the conveyer from bucket to bucket.

Alternately, a rotating auger conveyor can be used to convey soil in discrete portions up a tube. Ports in the auger permit water to flow down through auger assembly in a counter-current manner from soil portion to soil portion.

The apparatus and process of the invention has been devised to utilize the kinetic efficiency of a plug-flow process design. In plug flow design, partially cleaned liquid phase and soil do not mix with the fully contaminated soil and liquid phase entering the process, permitting the contamination to be extracted to low levels. This contrasts with the prior-art mixed reactor designs, wherein partially extracted materials back-flow and are fully mixed with fully contaminated feed as it enters the process. The contaminant extraction in such a mixed reactor system, therefore, is limited to the concentration in the mixed system. In addition, the present process incorporates a counter-current wash water flow. Therefore, the cleaner wash water is used to treat the wash cells with the lower contaminant concentration, which permits reduction of the contaminants in the soil to low concentrations. In addition, the plug-flow and counter-current extraction regime permits a relatively low flow of water to achieve an efficient removal of contaminants.

In a preferred embodiment, contaminated soil, is disengaged by addition of water and chemicals, and the soil with contaminate-containing liquid phase is charged to a rotating drum in which the soil is conveyed from the first end of the drum to the second end by means of a helical or screw conveyor fixed to the interior of the drum. Fresh wash water is added to the soil-outlet or second end of the drum, which has been slightly elevated such that the wash water cascades downward in a counter-current direction in relation to the motion of the soil. The walls of the screw conveyor act as water weirs, preventing any back-mixing in the axial direction of the flow of water. Between the weir-like walls of the screw conveyer, soil and liquid phase is conveyed in cells as discrete portions, with little soil mixing between the cells and no fluid back-mixing toward the soil-outlet or second end, providing an essentially plug-flow regime of the soil and liquid phase.

Extracted liquid phase with soil is discharged from the elevated second end of the drum and wash water which contains the original contaminants is discharged from the lower first end of the drum. In a preferred embodiment, wash water is then physically separated from any insoluble contaminant and recycled to the system to conserve the water and process additives.

The process of the invention is applicable for the removal of any substance or contaminant that can be washed from the soil by water, either alone or with added surfactant, pH modifiers, solubilizers, or other additives in the water. Such contaminants include materials that are solubilized or disengaged from the soil matrix by an aqueous system. Examples of contaminants include light, heavy, and viscous hydrocarbons, soluble and insoluble organic chemicals and soluble metals and minerals, including radionuclides. The process of the present invention is also applicable to removal of naturally occurring substances, such as metals, minerals, and the like. For example, the extraction from ores of gold using cyanide solutions, and the extraction of metal oxides using acidic solutions. Accordingly, the term contaminant, as used herein, includes naturally occurring substances in the soil and substances occurring due to human activity.

The improved results that can be achieved by practice of the invention can be illustrated by a brief theoretical description of the invention. Remediation of contaminated soil requires two physiochemical steps. The first step is to cause the contaminant to disengage from its physical or chemical association with the soil. The second step is to physically separate the disengaged contaminant from the soil particles. Process effectiveness may be defined as the degree to which the objectives of these two process steps are achieved. Process efficiency is defined as the approach to maximum theoretical effectiveness.

The Disengagement Step

Disengagement involves the release of the contaminant from the soil so that it can be incorporated in the liquid phase comprising water and contaminant. For contaminants that are very soluble in water and/or are lightly bound to the soil, disengagement may occur quickly in the wash cells near the first end of the wash zone. However, for most contaminated soils, the soil must usually be treated with water and chemicals in a separate disengagement means to disengage the contaminant from the soil. For water-insoluble contaminants, the treatment may include surfactant, pH modifiers, or other materials, such that the contaminant with water forms a two phase liquid, or an aqueous phase with suspended solid or liquid contaminants. For water-soluble contaminants, the pretreatment is under conditions to permit the contaminant to dissolve in water. After the disengagement treatment, the soil with the liquid phase, i.e., the treatment water containing contaminant, is introduced into the wash zone at the first end as previously described.

In a multicomponent, liquid-solid system, the partitioning of components between the liquid and solid state is governed by equilibrium thermodynamics. By definition, at equilibrium, the free energy of a component or contaminant in the water phase (determined by the contaminant level in the liquid phase) is equal to its free energy in (or on) the soil or solid phase. In a system in which it is desirable to effect a disengagement of contaminant (the components), from the surface of soil (the solid), efficiency may be defined as the approach to equilibrium. This is illustrated in Equation 1 for any component, A.

$$E_{DIS} = \frac{[A]_l/[A]_s}{[Ao]_l/[Ao]_s} \quad (1)$$

Where $[A]_l$ and $[A]_s$ are the levels of contaminant in the liquid phase and solid phase, respectively, which are achieved in a particular disengagement process, $[Ao]_l$ and $[Ao]_s$ are the like contaminant levels at equilibrium, and $E_{DIS}$ is the theoretical disengagement efficiency.

In practice, it is desirable to maximize the partitioning of contaminant into the water phase, or find conditions where:

$$[Ao]_l/[Ao]_s >> 1 \quad (2)$$

The objective of maximizing this partitioning to the water phase is achieved through adjustment of water chemistry and temperature.

It is also desirable to maximize the rate at which equilibrium is approached. This objective is achieved through adjustment of mechanical/physical processes.

In addition, equilibrium is approached more easily in a cocurrent, plug-flow system, which is the preferred regime for disengagement in the present invention. A cocurrent, plug-flow system provides approximately a first order kinetic regime. For such a co-current, first-order, plug-flow system, the rate at which equilibrium is approached may be modeled through the use of the empirical, first-order, kinetic expression:

$$E_{DIS} = 1 - ae^{-bt} \quad (3)$$

where a, b are constants, which are particular to each system, and t is residence time. In the practice of the invention, the residence time (t) should preferably be sufficient to achieve $E_{DIS} > 0.90$.

The Wash Step

The objective of the wash step is to physically separate contaminants which are disengaged and are with the liquid phase from the solid, or soil phase. Contaminants can be with the liquid phase as a component in solution or as a nonsoluble suspended liquid or solid or a separate phase from water in a multiphase liquid. Separation of these contaminants usually utilizes separation based on density differences. Separation of contaminants soluble in the water phase requires exchange of the contaminated water with uncontaminated or less contaminated water. In the apparatus and process of this invention, this is accomplished by the counter-current wash with staged dilution as previously described. Insoluble, lighter-than-water contaminants are washed toward the soil-inlet or first end at approximately the rate of water flow over the weirs, but in no case at less than the rate of wash achieved for soluble contaminants.

Process effectiveness ($R_A$) may be measured in terms of the ratio of the level of contaminant remaining with the soil after washing ($A_f$) to that originally contained on the soil ($A_o$).

$$R_A = \frac{[A]_f}{[A]_o} \quad (4)$$

The process or washing efficiency ($E_{WASH}$) is defined as the calculated or theoretical minimum process effectiveness ratio divided by the observed or actual ratio.

$$E_{WASH} = \frac{[A]_f/[A]_o \text{ (calculated)}}{[A]_f/[A]_o \text{ (observed)}} \quad (5)$$

The efficiency of an individual cell ($E_{CELL}$) is defined as the change in concentration about the cell divided by the theoretical maximum change in concentration possible for the cell:

$$E_{WASH} = \frac{[A]_{out} - [A]_{in}}{[A]^*_{out} - [A]_{in}} \quad (6)$$

The effectiveness of the overall process depends largely on the efficiency of the cells, the number of cells or stages, and the counter-current or internal flow ratio ($R_W$), i.e., the ratio of the amount of wash water flowing counter-current from cell to cell counter to the soil movement, to the amount of liquid phase carried along with the cells. For purposes of illustration, the cell efficiency $E_{CELL}$ can be assumed to be ideal, i.e., equal to 1 (and therefore the process efficiency $E_{WASH} = 1$). The theoretical process effectiveness ($R_A$) may then be calculated as a function of the number of cells or stages and the counter-current flow ratio. This data is shown in Table A for a variety of internal flow ratios ($R_W$) and number of cells (N). The data in Table 1 illustrates the wide range of flexibility and control over the level of decontamination which can be achieved in the preferred apparatus.

TABLE A

| | Ideal Process Effectiveness ($R_A$) for $E_{CELL} = 1$ | | | | | | |
|---|---|---|---|---|---|---|---|
| | | | | N | | | |
| $R_W$ | 5 | 10 | 12 | 14 | 16 | 18 | 20 |
| 0.5 | 0.51 | 0.50 | 0.50 | 0.50 | 0.50 | 0.50 | 0.50 |
| 0.8 | 0.27 | 0.22 | 0.21 | 0.21 | 0.20 | 0.20 | 0.20 |
| 1.0 | 0.17 | 0.091 | 0.077 | 0.067 | 0.059 | 0.053 | 0.048 |
| 1.2 | 0.10 | 0.031 | 0.021 | 0.014 | 9.4E-3 | 6.5E-3 | 4.4E-3 |
| 1.5 | 0.048 | 5.9E-3 | 2.6E-3 | 1.1E-3 | 5.1E-4 | 2.3E-4 | 1.0E-4 |
| 2.0 | 0.016 | 4.9E-4 | 1.2E-4 | 3.1E-5 | 7.6E-6 | 1.9E-6 | 4.8E-7 |
| 3.0 | 2.8E-3 | 1.1E-5 | 1.3E-6 | 1.4E-7 | 1.5E-8 | 1.7E-9 | 1.9E-10 |
| 4.0 | 7.3E-4 | 7.2E-7 | 4.5E-8 | 2.8E-9 | 1.7E-10 | 1.1E-11 | 6.8E-13 |
| 5.0 | 2.6E-4 | 8.2E-8 | 3.3E-9 | 1.3E-10 | 5.2E-12 | 2.1E-13 | 8.4E-15 |

From Table A it can be seen how process effectiveness ($R_A$) can be increased by increasing the internal flow ratio ($R_W$) and/or the number of cells in the process (N). In addition, it can also be seen how extremely low amounts of contaminants in or on the soil, as shown by the process effectiveness ($R_A$) can be achieved. In an actual process, process efficiency ($E_{WASH}$) is expected to be less than 1 (the ideal case), but results of an actual process would follow a similar pattern. To achieve the same low contamination levels of Table A where $E_{CELL} < 1$, the number of cell stages (N) and/or the internal flow ratio ($R_W$) can be increased. In addition, the cell efficiency may approach 1 if the residence time of each cell in the process is long enough.

In summary, by practice of the invention a high degree of flexibility in achieving desired results is possible. By manipulating process variables, such as the internal flow ratio ($R_W$), a desired degree of remediation can be achieved. This contrasts with the prior-art stirred tank designs which have an inherent limit to the degree of remediation, and do not have the degree of flexibility for achieving a desired result as the present invention.

In the present invention with the plug-flow for the soil and with a counter-current flow of wash water an unexpectedly high degree of decontamination is achieved. From a practical standpoint, such results are not achievable using traditional stirred reactor washing processes. To achieve such results in a stirred tank washing process, an extremely large amount of wash water, and numerous washing stages would be required, which from a capital cost and operating cost standpoint would not be practical. The preferred cocurrent plug flow design of the disengagement step and the counter-current plug-flow design of the wash step are designed to minimize residence time and therefore, increase throughput capacity for a given reactor space. This results in lower capital and operating costs.

The process of the invention requires low energy and utilities, reducing demand on valuable resources. In addition, since the present process is essentially a water based washing process, there are essentially no hazardous emissions or effluents to the atmosphere. The final water waste stream containing the contaminants has a relatively high contaminant concentration in small volume, which allows the waste stream to be easily treated and disposed of.

DETAILED DESCRIPTION OF THE INVENTION

Figure 1:
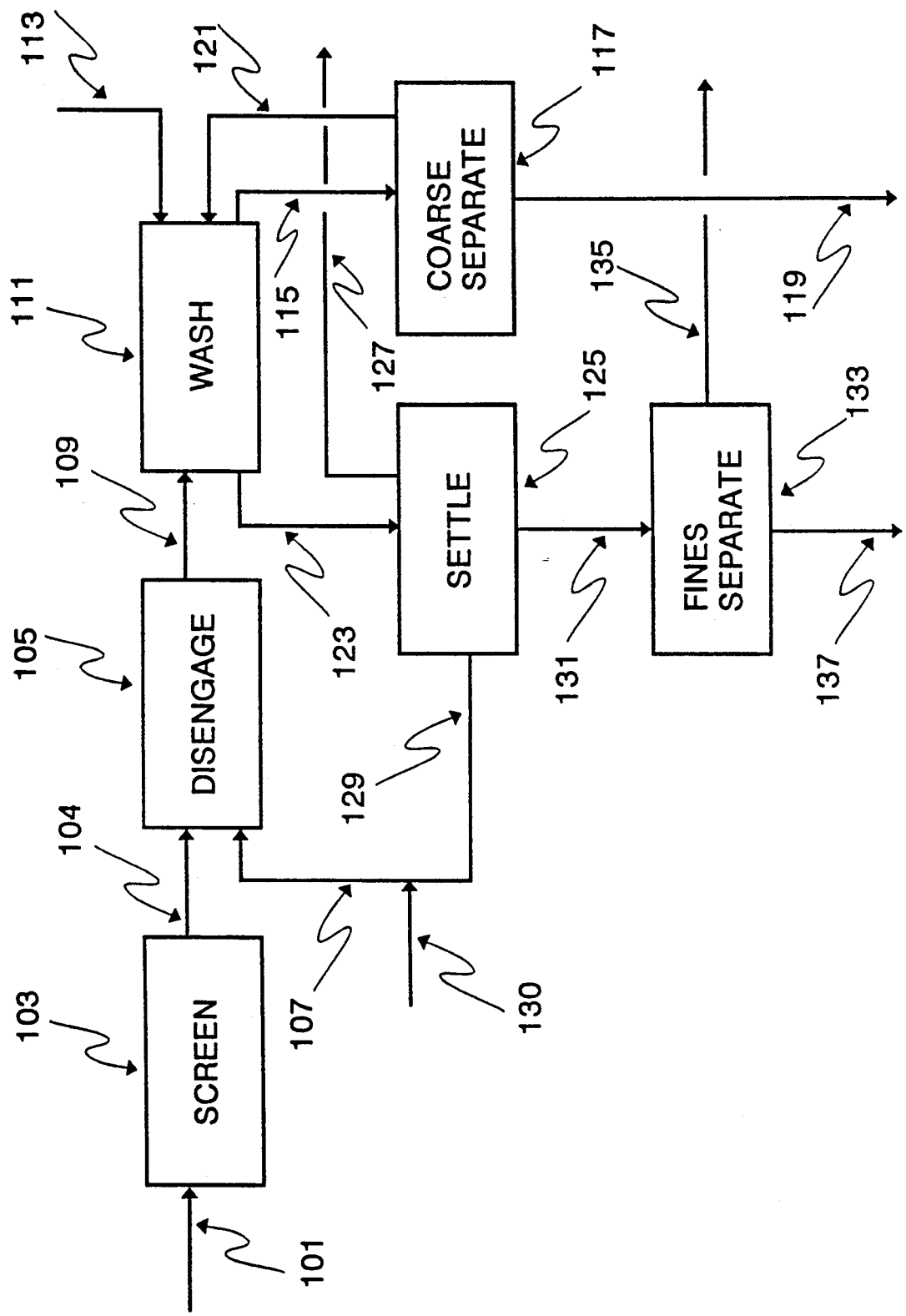
FIG. 1 is a flow diagram showing a remediation process incorporating an apparatus of the invention.

FIG. 1 is a flow sheet showing a simplified process configuration where the apparatus of the invention can be used. Contaminated soil entering on flow line 101 is first screened of oversized material at screen 103 and sent to a disengagement apparatus 105 via line 104 where it is mixed with water (entering from line 107), along with any other chemicals such as pH modifiers, and surfactants, to enhance the disengagement of the contaminant from the soil. Soil, and liquid phase (water with disengaged contaminant) leaves through line 109 and is charged to a wash apparatus of the invention 111, where it is subjected to counter-current wash under plug flow. Clean wash water enters through line 113. Cleaned soil is discharged from wash apparatus 111 through line 115 and dewatered (separated from the extracted liquid phase) in separator 117, and removed from the process though line 119. The separated water is recycled via line 121 to the wash apparatus 111 as a supplement to the fresh water feed from line 113.

The wash water containing contaminant, and fine soil particles, is discharged from the wash apparatus 111 via line 123 to settler 125 and allowed to settle. Floating contaminants in the wash water are sent via line 127 to a product treatment facility (not shown), utilizing more-or-less conventional petroleum and/or chemical processes. Water from the settler 125 is recycled via line 129 to the disengagement device 105 for conservation of water and chemicals. Make-up chemicals are added through line 130 as required.

The wet fines are sent from the settler 125 via line 131 to a separation apparatus 133. Conventional water separation solids technology may be used here, including, but not limited to, thickening, coagulation, filtration, inclined-plate settling, centrifugation, etc. Water recovered from this unit via line 135 may also be recycled or sent to treatment facilities prior to discharge or recycle. The fines from the separation device are recovered through line 137.

Figure 2:
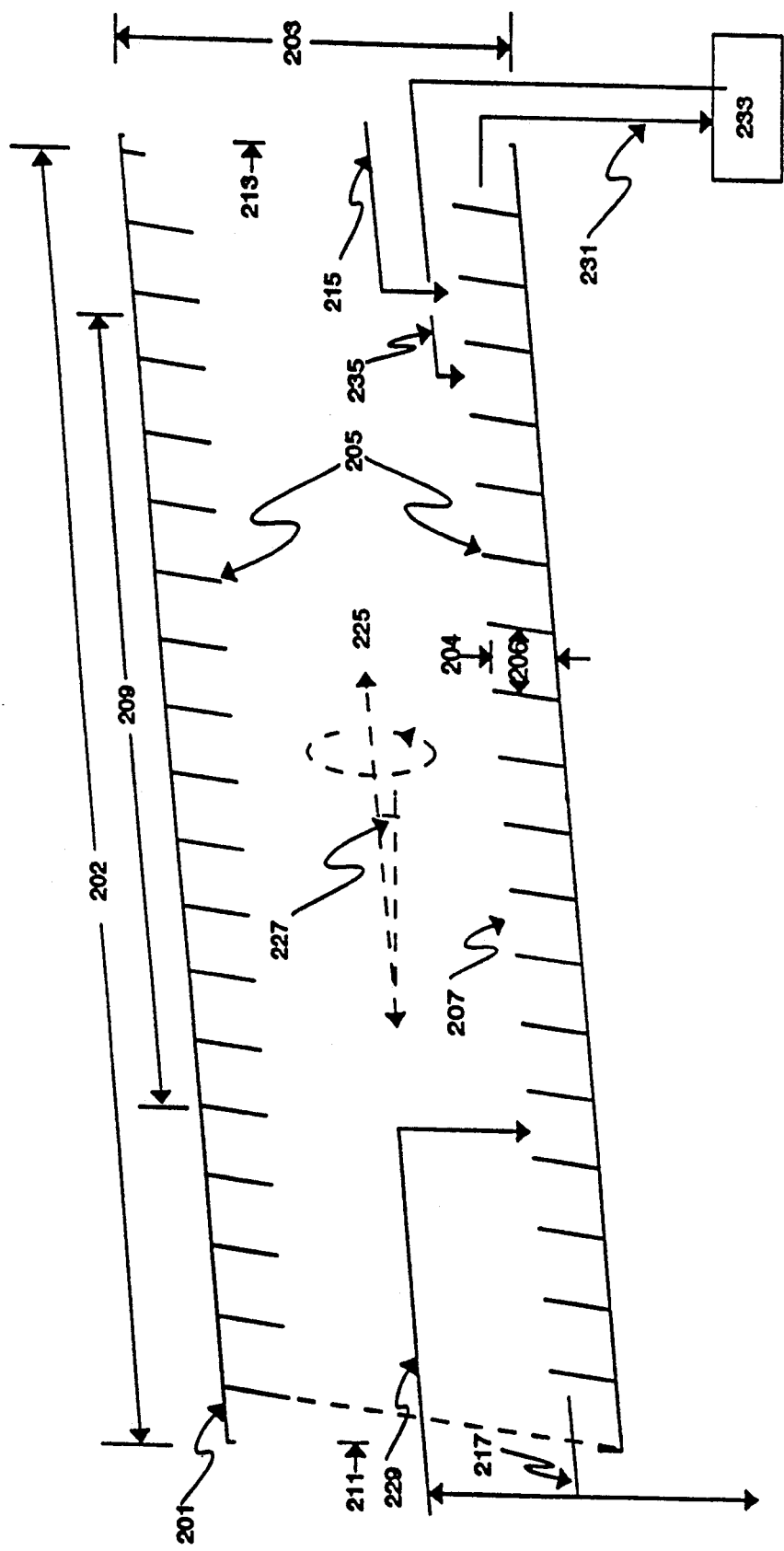
FIG. 2 is a cross-section of a preferred apparatus of the invention.

Referring to FIG. 2, which is a simplified cross-section of a wash apparatus of the invention, apparatus comprises a drum 201 with the axis of rotation 225 on a tilted alignment (at angle 227). The diameter 203 and length 202 of the drum depend upon such factors as desired capacity and height, width and weight transport restrictions. The drum 201 is internally outfitted with a helical weir wall 205, which has a height 204 and pitch 206 determined by the diameter 203 of the drum 201, the desired residence time, the speed of rotation of the drum and factors pertaining to mixing energy. A wash cell 207 for transporting a soil portion through the drum is formed by a single revolution of the helical weir wall 205. In the drum 201 a wash zone 209 is provided, with a soil-inlet or first end 211 and a soil-outlet or second end 213. At the second end 213 is a wash water feed 215 for introducing water in wash cells 207 as they pass to the second end 213. As wash cells 207 are conveyed through the wash zone 209, successive wash cells 207 reach the second end 213 in turn, and receive water from the water feed 215. At the first end 211 is a line 217 for withdrawing water which has cascaded over the weir walls. The first end 211 and second end 213 of the wash zone may correspond with or are near the physical ends of the drum 201. However, if it is desired to convey wash cells 207 containing the discrete soil portions through a drum portion before entering or after leaving the wash zone 209 for further mixing or processing, the drum 201 ends may extend any distance beyond the first end and second ends 211, 213 of wash zone 209.

Figure 2A:
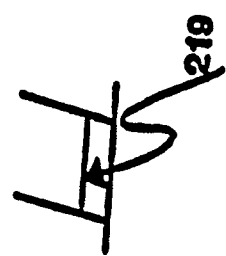
FIGS. 2a to 2c are details of the cell lifters from the apparatus of FIG. 2.
Figure 2B:
Figure 2C:

FIGS. 2a, 2b, and 2c, are detail views of a wash cell 207, from the side, the end, and the top respectively. In order to provide a mixing in the cells 207, lifters 219 of a specified height profile, extend across the segments between the rotations of helical weir. The height profile and the number of lifters 219 are designed to provide adequate solution mixing energy while, at the same time, allow fine soil particles to settle and be conveyed with the soil. The lifters 219 are tilted backward at an angle 221 to provide convenient draining as the lifter 219 passes from a submerged state to a non-submerged state. The lifters 219 may also be mounted at an angle 223 to the drum axis 225 (in FIG. 2) to provide thrust of the coarsest material in the direction of soil flow.

The axis 225 of the drum 201 is tilted at an angle 227 to the horizontal to provide counter-current washing by means of gravity. The angle 227 is chosen so as to prevent back mixing of water as it passes over the screw conveyor weir walls 205.

During operation of the apparatus of FIG. 2, contaminated soil enters via line 229 at the first end 211 of the drum and enters a cell 207. As the drum 201 rotates on axis 225, the helical arrangement of the weir wall 205 causes the cell 207 and its contents to migrate towards the second end 213. The soil and liquid phase are conveyed a discrete portion within the cell 207, without any substantial mixing with adjacent cells 207. At the second end 213, cleaned soil is ejected by the rotation of the helical weir wall 205 and is dumped via line 231 into a suitable filtering or dewatering apparatus 233, which is here not specified and shown as a box. Water from the dewatering apparatus 233, is recycled via line 235 by introducing it into the second end 213. The water from the recycle 235 and fresh water from the wash water feed introduced through line 215 are introduced into a cell 207 at the second end 213. The wash water cascades from that cell to adjacent cells 207 successively in turn toward the first end 211, which is counter to the plug-flow of the soil. The weir wall 205 that defines the discrete cells 207 also prevents the backflow of water between cells 207 toward the second end 213. The wash cells 207 contain the liquid phase, i.e., water containing contaminant disengaged from the soil, and is carried along with the discrete portions of soil. The liquid phase containing the disengaged contaminants is successively diluted and the concentration of contaminant remaining with the water discharged with the soil at the second end 213 is lowered to a concentration in accordance to the operating conditions, as illustrated in Table A. Thus, the system is essentially a plug-flow cleaning system, with wash water flowing counter-currently to the liquid phase conveyed in the wash cells.

The process effectiveness ($R_A$), the ratio of contaminants in the water leaving the last cell to the separator 233 to the contaminants in the waste water stream, can be easily controlled, primarily by regulating the internal water flow ratio, the ratio of the rate of flow of the liquid phase up through the drum to the rate of the counter-current flow of water down through the drum. Other factors controlling process effectiveness, are the number of cells in the wash zone, as described above. The process effectiveness may be limited to the extent that the soil may contain contaminants in spaces accessible only through small pores, through which the washing medium is unable to penetrate.

Figure 3:
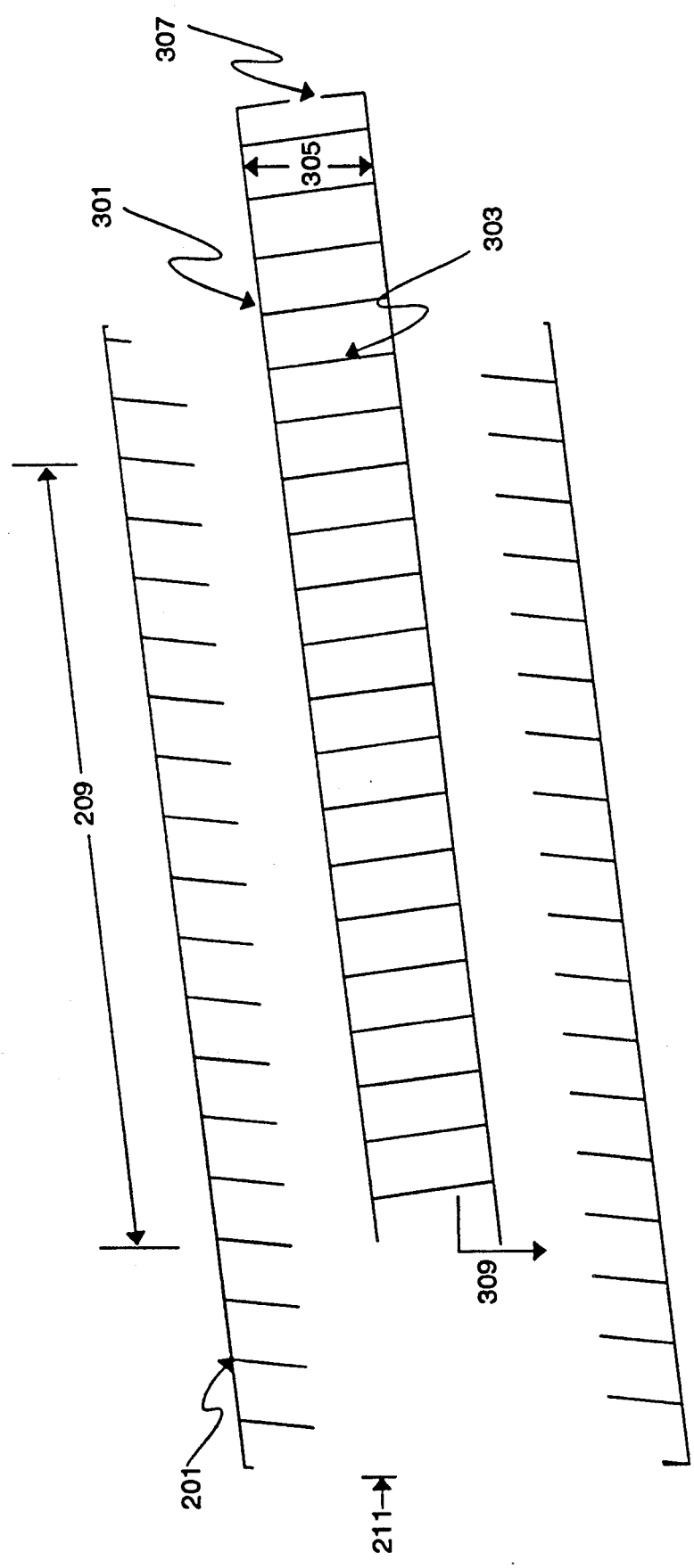
FIG. 3 is a cross-section of another preferred apparatus of the invention.

In FIG. 3 is shown a preferred apparatus of the invention incorporating an integral disengagement unit within the wash drum. The drum 201 is similar to that of FIG. 2, and is shown with the same reference numbers.

The disengagement unit 301 is preferably configured with a helical or screw conveyor 303 fixed to the inside of a cylindrical tube or drum 305. The screw conveyor 303 provides a plug flow through the drum 305. In certain installations, a partial plug flow may be achieved without the screw conveyor, i.e., with no extra conveyor means inside the drum 305. Soil and water are introduced at the elevated or feed end 307, and aqueous phase and disengaged soil are withdrawn from the disengagement zone outlet 309 and deposited at the first end 211 of the wash zone 209. Lifters (not shown) may be attached to the outer edges of the helix, to provide mixing, stirring, shear stress and other visco-mechanical forces designed to accelerate the rate of approach to equilibrium. The general kinetic equation defining this process is given in Equation 3 above. The dimensions of the pitch and diameter of the helix are determined by the required residence time and the desired throughput rate. The disengagement unit may be fixed to the rotating wash apparatus and rotated at the same angular velocity for ease of operation. For such a configuration, the left or right handedness of the disengager helix must be opposite that of the helical weir wall of the wash apparatus. The disengager apparatus functions as a co-current plug flow reactor and the approach to equilibrium follows first order kinetics as described above. Alternately, the disengagement unit may not be fixed and may rotate independently, which would provide more flexibility of operation of the disengager apparatus, but at a cost of more mechanical complexity. The disengager apparatus may also be a totally separate unit in which soil is conveyed between the disengager zone and the wash zone by a suitable conveyer means, such as a conduit pipe or a conveyor belt.

EXAMPLES

Example 1A

Test of Wash Efficiency for Water-Soluble Contaminant Using Low Water Rate

A wash drum and disengager essentially as illustrated in FIGS. 2 and 3, was used. The wash drum was outfitted with ten cells in the counter-current wash zone was charged continuously with soil containing a water-soluble contaminant. A test sample of soil was prepared by mixing with a water soluble material (#40 Red Food Coloring), which was used as a simulated water soluble contaminant for removal from the soil. The disengagement step was carried out with an apparatus essentially as FIG. 3, above, and operated as described for FIG. 3.

For the wash step, fresh wash water was added at a rate of 2 gal/min. The water discharged from the second end with the liquid phase was recycled at a flow rate of 10 gal/min into the wash water. Wash water discharged from the first end was recycled at a flow rate of 6 gal/min into the soil feed, and became incorporated into the liquid phase. About 2 gal/min of wash water discharged from the first end was withdrawn as a drag or water output stream. The internal flow ratio ($R_W$) was 1.2.

Under these conditions, the theoretical process effectiveness ($R_A$) was 0.115. The ratio accounts for the fact that at steady state the water recycled from the second end contained small concentrations of contaminant, as compared with the data in Table A where fresh water was assumed for the counter-current wash. The actual measured process effectiveness ratio ($R_A$) was 0.117, demonstrating a process efficiency ($E_{WASH}$) of 0.98.

Example 1B

Test of Wash Efficiency for Water-Soluble Contaminant at High Water-Flow Rates

A second experiment was conducted under conditions as described in Examples 1A, above. In this case, the internal flow ratio ($R_W$) was 1.5. Under these conditions, the theoretical process effectiveness ($R_A$) was 0.00977. The experimental process effectiveness ($R_A$) was equal to 0.0114, demonstrating a wash efficiency ($E_{WASH}$) of 0.86. The process effectiveness ratio ($R_A$) was about one-tenth of that of Example 1A, which indicates the absolute effectiveness for soil remediation was about ten times that of Example 1A. This relationship is consistent with the relationship of the process effectiveness shown in Table A above.

Example 2

Test for Removal of Petroleum Hydrocarbons from Soil

An apparatus of the invention as illustrated in FIG. 3 was constructed with a continuous soil feed mechanism.

The wash drum was 35 inches in diameter and the helical weir wall had a pitch of 6 inches. The drum was about 10 feet long providing 20 wash cells in the wash zone. The disengagement apparatus was fixed within the wash drum, and placed to eject soil and liquid phase at the first end of the wash drum. The diameter and length of the disengagement drum were 16 inches and 12 feet respectively, and it had an internal screw conveyor with a pitch of 16 inches. The wash drum and disengagement drum were rotated about 4 rpm on an axis tilted 5° from the horizontal. This provided about 2 minutes for the soil residence time in the disengager, and about 2.5 minutes residence time in the wash drum.

Soil contaminated with 2.5 wt. % motor oil was charged to the system at a rate of two tons/hour. The internal flow ratio ($R_W$) was 1.5. The water pH was maintained between 8 and 10. The system was operated with water recycle as described in Example 1 for one hour to achieve a steady state, after which the results in Table B were obtained.

TABLE B

| Motor Oil Contaminated Soil Remediation | |
|---|---|
| Contamination on Soil Feed | 25000 ppm |
| Contamination on Discharged Soil | 2000 ppm |
| Contamination in Water Drag Stream | 50 ppm |
| Contamination on Thickener Bottoms | 600 ppm |

The remaining contaminant was recovered from the wash output as floating oil using skimming devices. The wash water drawn from the process was treated by a thickener to remove suspended fines.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A process for remediation of soil containing contaminants comprising;
   (a) treating contaminant-containing soil with water to disengage contaminant from the soil and form a liquid phase containing water and contaminant,
   (b) continuously introducing the treated soil and the liquid phase from step (a) into a wash zone at a first end of the wash zone,
   (c) conveying the soil through the wash zone by moving the soil and the liquid phase between the first end and a second end of the wash zone in successive and discrete portions with essentially no mixing of the soil between the discrete portions and essentially no flow of water between discrete portions in the direction from first end toward the second end,
   (d) introducing wash water into the wash zone by adding the wash water to each discrete portion as said discrete portion reaches the second end of the wash zone,
   (e) conveying by gravity the wash water through the wash zone from the second end toward the first end counter to the conveyance of the discrete portions, such that the wash water passes between and through the discrete portions to remove contaminants from the liquid phase in each discrete portion,
   (f) withdrawing each discrete portion from the wash zone as said discrete portion reaches the second end of the wash zone, said discrete portions reaching the second end containing soil and liquid phase with contaminant removed, and
   (g) withdrawing contaminant-containing wash water from each discrete portion as said discrete portion enters the wash zone at the first end.

2. The process of claim 1 wherein the water in step (a) contains additives to assist disengagement of the contaminants from the soil.

3. The process of claim 1 wherein the withdrawn soil and liquid phase from step (f) is treated to separate liquid phase from the soil.

4. The process of claim 3 wherein at least a portion of the separated liquid phase is recycled to the wash water introduced into the wash zone in step (d).

5. The process of claim 3 wherein at least a portion of the separated liquid phase is recycled to the water in step (a) to disengage the contaminant from the soil.

6. The process of claim 1 wherein at least a portion of the wash water withdrawn in step (g) is recycled to the water in step (a) to disengage the contaminant from the soil.

7. The process of claim 1 wherein the wash water withdrawn in step (g) is treated to remove contaminants in the wash water.

8. The process of claim 1 wherein the wash water withdrawn in step (g) is treated to remove fine solid materials from the soil.

9. The process of claim 1 wherein the internal flow ratio is greater than 1.

10. The process of claim 1 wherein the amount of contaminant in the wash water withdrawn in step (g) is controlled by varying the number of discrete portions being conveyed within the wash zone.

11. The process of claim 1 wherein the amount of contaminant in the wash water withdrawn in step (g) is controlled by varying the internal flow ratio.

* * * * *